United States Patent
Eichstaedt et al.

(10) Patent No.: US 6,381,594 B1
(45) Date of Patent: Apr. 30, 2002

(54) SYSTEM AND METHOD FOR PERSONALIZED INFORMATION FILTERING AND ALERT GENERATION

(75) Inventors: Matthias Eichstaedt, Sunnyvale; Ashvinkumar P. Patel, Los Altos Hills; Qi Lu, San Jose; Udi Manber, Palo Alto; Kristine Rudkin, San Mateo, all of CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/613,436

(22) Filed: Jul. 11, 2000

Related U.S. Application Data

(60) Provisional application No. 60/143,473, filed on Jul. 12, 1999.

(51) Int. Cl.[7] .............................................. G06F 17/30
(52) U.S. Cl. ........................ 707/3; 707/10; 707/104.1; 709/201; 709/219; 717/8; 717/9
(58) Field of Search ........................... 707/1, 3, 5, 10, 707/100, 104.1, 6; 717/1, 7, 8, 9; 709/201, 203, 217, 219

(56) References Cited

U.S. PATENT DOCUMENTS

| | | | | |
|---|---|---|---|---|
| 5,488,725 A | * | 1/1996 | Turtle et al. | 707/5 |
| 5,535,382 A | * | 7/1996 | Ogawa | 707/5 |
| 5,671,404 A | * | 9/1997 | Lizee et al. | 707/5 |
| 5,870,733 A | * | 2/1999 | Bass et al. | 707/2 |
| 5,890,152 A | * | 3/1999 | Rapaport et al. | 707/6 |
| 5,970,493 A | * | 10/1999 | Shoup et al. | 707/100 |
| 5,983,214 A | * | 11/1999 | Lang et al. | 707/1 |
| 5,987,457 A | * | 11/1999 | Ballard | 707/5 |
| 6,029,161 A | * | 2/2000 | Lang et al. | 707/1 |
| 6,029,165 A | * | 2/2000 | Gable | 707/3 |
| 6,065,001 A | * | 5/2000 | Ohkubo et al. | 707/3 |
| 6,208,988 B1 | * | 3/2001 | Schultz | 707/5 |
| 6,226,635 B1 | * | 5/2001 | Katariya | 707/4 |

OTHER PUBLICATIONS

U.S. International Searching Authority; International Search Report; Oct. 13, 2000; five pages.

* cited by examiner

*Primary Examiner*—Hosain T. Alam
*Assistant Examiner*—Shahid Alam
(74) *Attorney, Agent, or Firm*—Townsend and Townsend and Crew LLP

(57) ABSTRACT

A search engine that forms a compact representation of a plurality of user queries to efficiently find desired information in an information network. The search engine comprises a profile processor having logic to receive the queries from the users and a search module. The search module is coupled to the profile processor and has logic to receive the information content, to combine the user queries into a master query, and to match the master query with the information content to determine matching content. The search engine also includes logic to analyze the matching content to determine if any of the queries has been satisfied.

13 Claims, 7 Drawing Sheets

SYSTEM AND METHOD FOR PERSONALIZED INFORMATION FILTERING AND ALERT GENERATION

CROSS-REFERENCES TO RELATED APPLICATIONS

This application claims priority from U.S. Provisional Application No. 60/143,473 filed Jul. 12, 1999, the disclosure of which is incorporated in its entirety herein for all purposes.

FIELD OF THE INVENTION

The present invention relates to search engines, and more specifically, to a search engine capable of efficiently searching a diverse stream of information content for information matching search queries from a plurality of users.

BACKGROUND OF THE INVENTION

A search engine is a program that helps users find information in an information network. Users submit search queries comprising words or phrases indicating what they are searching for, and the search engine replies with a list of Web pages it predicts are relevant to that query. A page considered by a search engine for inclusion in this list can be termed a "target page".

The list of Web pages returned by a search engine is ranked by relevancy. Typically, relevancy is determined mostly by the content of the target pages. For example, if the user searches for the phrase "chocolate cake", a typical search engine will rank pages containing the phrase "chocolate cake" before those which merely contain the words "chocolate" and "cake" separately, and those pages will in turn be ranked higher than pages that contain one of the two words but not the other.

Today many sites on the Internet offer large volumes of time sensitive content, such as financial news, business news, real-time weather reports, and other types of streaming media content. However, current search systems may operate very inefficiently when handling a large volume of user requests. As a result, most users are overwhelmed with finding the information they desire at a time when its available.

One problem relating to the efficiency of current search systems is the problem of efficiently filtering a large diverse stream of electronic information to a large collection of users. For example, thousands of users may submit search queries for financial information in any given day. Typically, each user's query is individually searched with the result provided directly to the user. However, many of the users may have overlapping queries that result in repetitive searches only to obtain the same information.

Another problem with current search systems occurs when one or more users want to perform the same or similar searches periodically over time to find the most recent information that becomes available. This is referred to as a "persistent query." Typical search systems fail to efficiently handle persistent queries from a large number of users.

SUMMARY OF THE INVENTION

The present invention provides a search engine that forms a compact representation of a plurality of user queries to efficiently find desired information in an information network. Each of the user queries, which are part of a user profile, are pre-processed to substitute special characters for numerical values and enumerated data types. The search engine includes an efficient mechanism to combine the pre-processed user queries into a master search query and to match the master query with information in a content stream transmitted over the data network. Thus, the present invention reverses the traditional information retrieval approach of indexing a collection of documents separately for each user query by providing a well-organized and compact representation of the user queries through which information flows.

The search engine allows a user to enter a set of long-standing or persistent queries representative of the user's interests. Instead of performing repetitive searches for each individual user, the search engine effectively combines all user queries to form a master search query. Information content received by the search engine is matched with the master search query to produce a search result. Selected information in the search result is delivered to each individual user in accordance with a user profile that includes user contact rules.

As the Internet continues to grow, the information processed by the included search engine can be very diverse. For example, on-line classified advertisements can be automatically delivered to users who are looking for a place to live.

Information regarding new products within a certain price range can be delivered to consumers to assist them in their purchasing decisions. Other information areas that personalized information delivery would benefit users include news articles, weather and traffic information, online auctions and other time sensitive postings.

The information delivery mechanisms include email, instant Internet messaging products (Yahoo! Messenger, AOL Instant Messenger, etc.), wireless text messaging, fax, voice messages, and personalized Web pages.

In one embodiment of the invention, a search engine for receiving information content over a data network and searching the information content based on a plurality of queries associated with a plurality of users is provided. The search engine comprises a profile processor having logic to receive the queries from the users and a search module. The search module is coupled to the profile processor and has logic to receive the information content, to combine the user queries into a master query, and to match the master query with the information content to determine matching content. The search engine also includes logic to analyze the matching content to determine if any of the queries has been satisfied.

A further understanding of the nature and advantages of the inventions herein may be realized by reference to the remaining portions of the specification and the attached drawings.

DESCRIPTION OF THE SPECIFIC EMBODIMENTS

A search engine included in the present invention allows users to enter parameters including search queries to establish user profiles. The search engine combines the queries in the user profiles to form a master query to allow an efficient search of streaming information content in a data network. Detected matches between the streaming information and the master query are analyzed to determine which user queries are satisfied so that the relevant information can be distributed to the associated users. The search results are also stored in a memory for later retrieval if desired.

The search engine provides benefits in the following three ways. First, the user queries are organized in a compact representation where common interests among the queries are shared. Users typically have common interests (sports teams, traffic reports) when a large subscriber base is reached. This invention takes advantage of common interests by combining them into one entity to enable efficient processing. Second, numerical values and values from enumerated types appearing in user queries are substituted with special text patterns allowing very fast processing. Third, a hierarchical organization of all users' numerical values is used for determining matching documents in an efficient manner.

Figure 1:
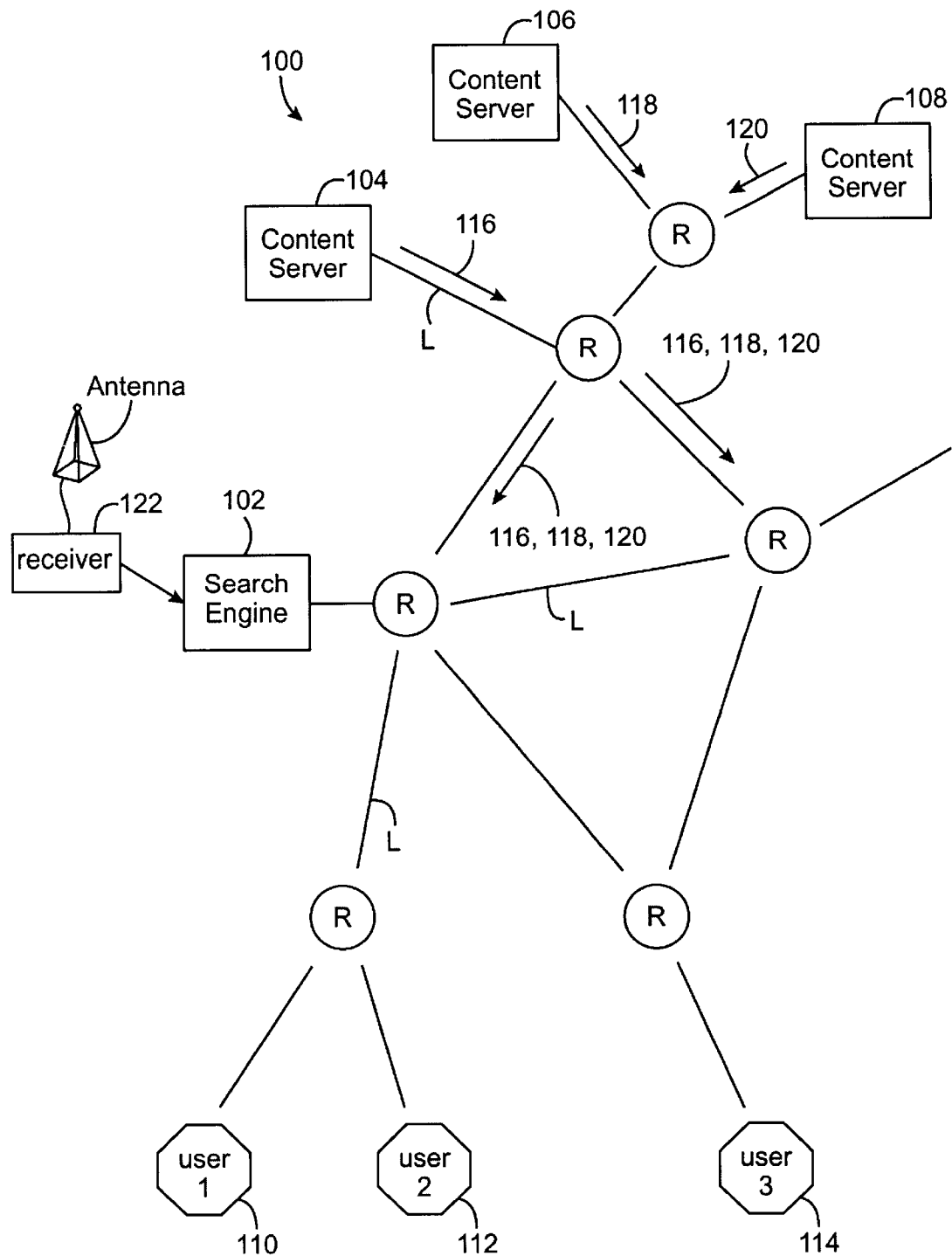
FIG. 1 shows a portion of a data network that includes a search engine in accordance with the present invention.

FIG. 1 shows a data network 100 including a search engine 102 constructed in accordance with the present invention. The data network 100 utilizes addressable routers (R) connected by data links (L) to form an interconnected network wherein information may be distributed. One or more content servers, such as content servers 104, 106, and 108, distribute information over the network for use by users, such as users 110, 112, and 114. The information content may comprise any type of streaming information, including but not limited to, news, business or financial information, weather broadcasts, or other type of information or document streams. For example, in FIG. 1 the content server 104 transmits a news information stream as shown at 116. The news information stream 106 may consist of any type of news reports, such as Associated Press news reports. The content server 106 transmits financial information as shown at 118. The financial information may consist of stock quotes, company reports or other types of financial information. The content server 108 transmits weather reports as shown at 120. The weather reports may consist of weather bulletins or other types of weather report, such as those from the National Weather Service. The information streams (116, 118, 120) are transmitted around the network 100 so that they can be received by other network entities including the search engine 102.

In practice, many more clients would be connected to the network than the three clients shown. Also, although only one search engine is shown, it is also possible to have more than one search engine used in any particular network. It is also possible that the search engine 102 receives information content from other sources using other transmission means, such as from a wireless transmission of information received by a receiving station 122 coupled to the search engine 102.

Several elements in the system shown in FIG. 1 are conventional, well-known elements that need not be explained in detail here. For example, the users 110, 112 and 114 may interact with the network 100 using a desktop personal computer, workstation, cellular telephone, personal digital assistant (PDA), laptop, or any other computing device capable of interfacing directly or indirectly to the Internet. The present invention is suitable for use with the Internet, which refers to a specific global Internetwork of networks. However, it should be understood that the present invention is suitable for use with other networks instead of the Internet, such as an Intranet, an Extranet, a virtual private network (VPN), a non-TCP/IP based network, a wireless network, or the like.

The interconnections between content servers and the search engine are shown with respect to the network 100, but those connections might also be handled over other transmissions means, such as through a wireless network. Except for the details described herein and their equivalents, the search engine is suitable for use with a conventional content server, therefore further details of the precise operation of a content server need not be set out here. The users 110, 112, and 114 typically include hardware that runs a browsing program allowing two-way interaction with entities of the network 100, such as the search engine 102.

Figure 2:
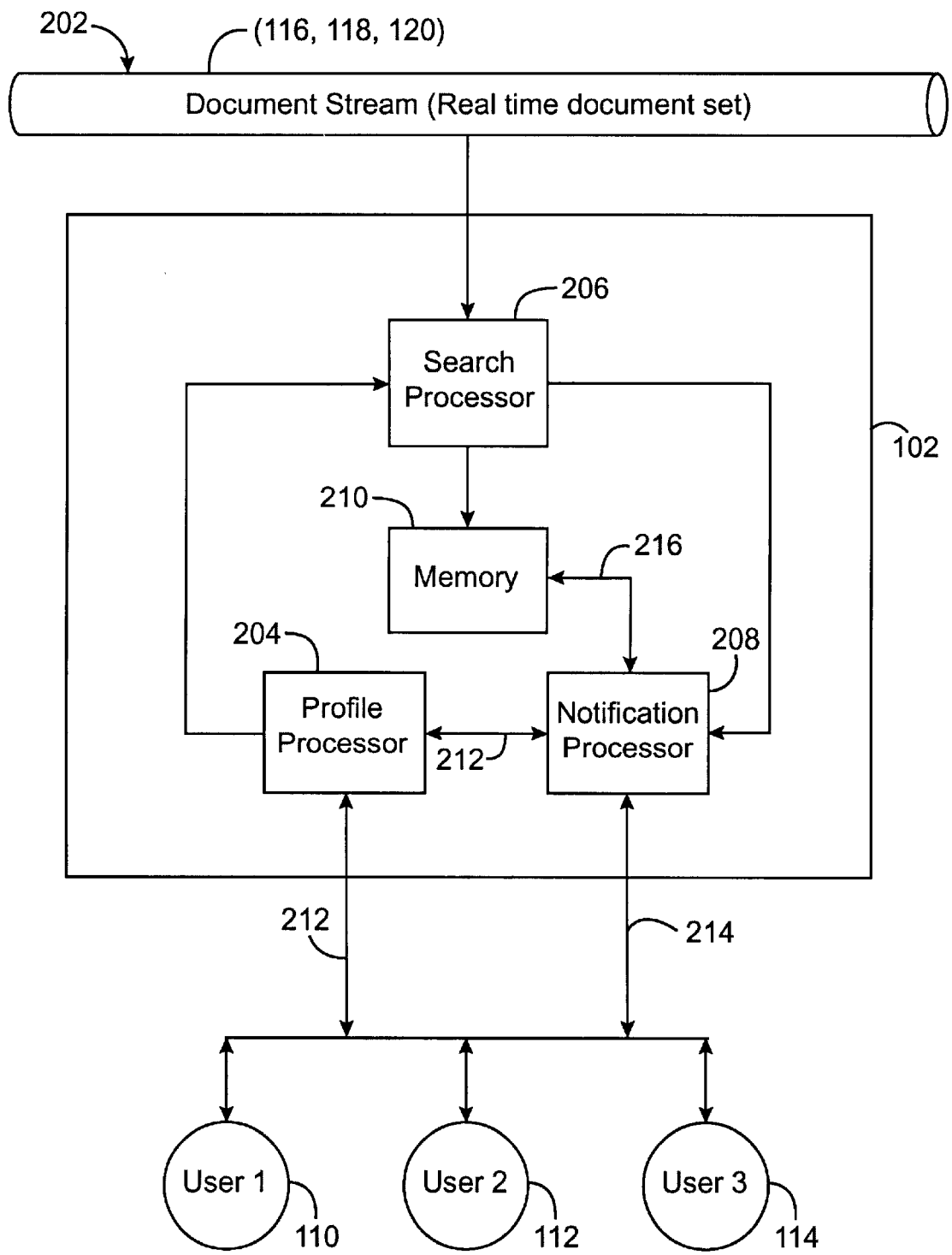
FIG. 2 shows a detailed block diagram of the search engine of FIG. 1.

FIG. 2 shows a block diagram of the search engine 102 constructed in accordance with the present invention. For the purposes of clarity, details of the network 100 are not shown in FIG. 2 making it is possible to see how the search engine 102 interacts with the users 110, 112 and 114 and information content stream 202. The information content 202 includes the information streams 116, 118 and 120.

The search engine 102 includes a profile processor 204, a search processor 206, a notification processor 208 and a memory 210. The profile processor 204 interacts with the users 110, 112, and 114 to create user profiles from user queries and user contact information. The users 110, 112, and 114 interact with the profile processor over the path shown at 212. The profile processor 204 may contain an internal memory (not shown) to store the profile information, or may use an external memory, such as the memory 210.

The search processor 206 receives the user queries from the profile processor and pre-processes the user queries to substitute special characters for numerical values and enumerated data types. The search processor then creates a master query that is matched with the incoming information stream 202. The results of the matching operation are analyzed to determine which user queries have been satisfied. The results of the matching operation are also stored in the memory 210 and sent to the notification processor 208.

The notification processor 208 receives the results from the search processor 206, which includes indications about query matches and related matching documents. The notification processor 208 receives notification contact information relating to the users from the profile processor as shown at path 212. Using the notification contact information, the notification processor 208 transmits the information retrieved from the search to the appropriate user. The transmission may be over a network path, as shown at 214, or via some other transmission path specified by the users, such as fax or voice mail.

The memory 210 is used to store the results produced by the search processor for later retrieval by the users. For example, if the user 110 enters a persistent query in the morning, the results can be retrieved later that day when the user 110 contacts the notification processor 208, which in turn, checks the memory 210 via path 216, to determine if there are any results to report to the user.

One embodiment of the present invention operates under the assumption that text documents (news articles, product descriptions, classified ads) included in the information content are searched using traditional keyword based queries provided by the users. In addition, each information document can include a set of numeric values (such as a product price) and enumerated data types (such as the colors or sizes). The user queries may contain a range of values (a price range, for example) that must match the delivered documents. Thus, in one embodiment, the invention forms a compact representation of the user queries for use with an efficient mechanism to match text data, numerical values as well as enumerated data types. The system takes advantage of common interests among the user queries and aggregates similar queries into a master query.

The user query generation is facilitated by an interactive interface. For example, the system suggests a set of keywords for a persistent query based on the news article that the user currently views. The personal interest profiles may also be derived from online applications such as a shopping list or a gift registry.

Figure 3:
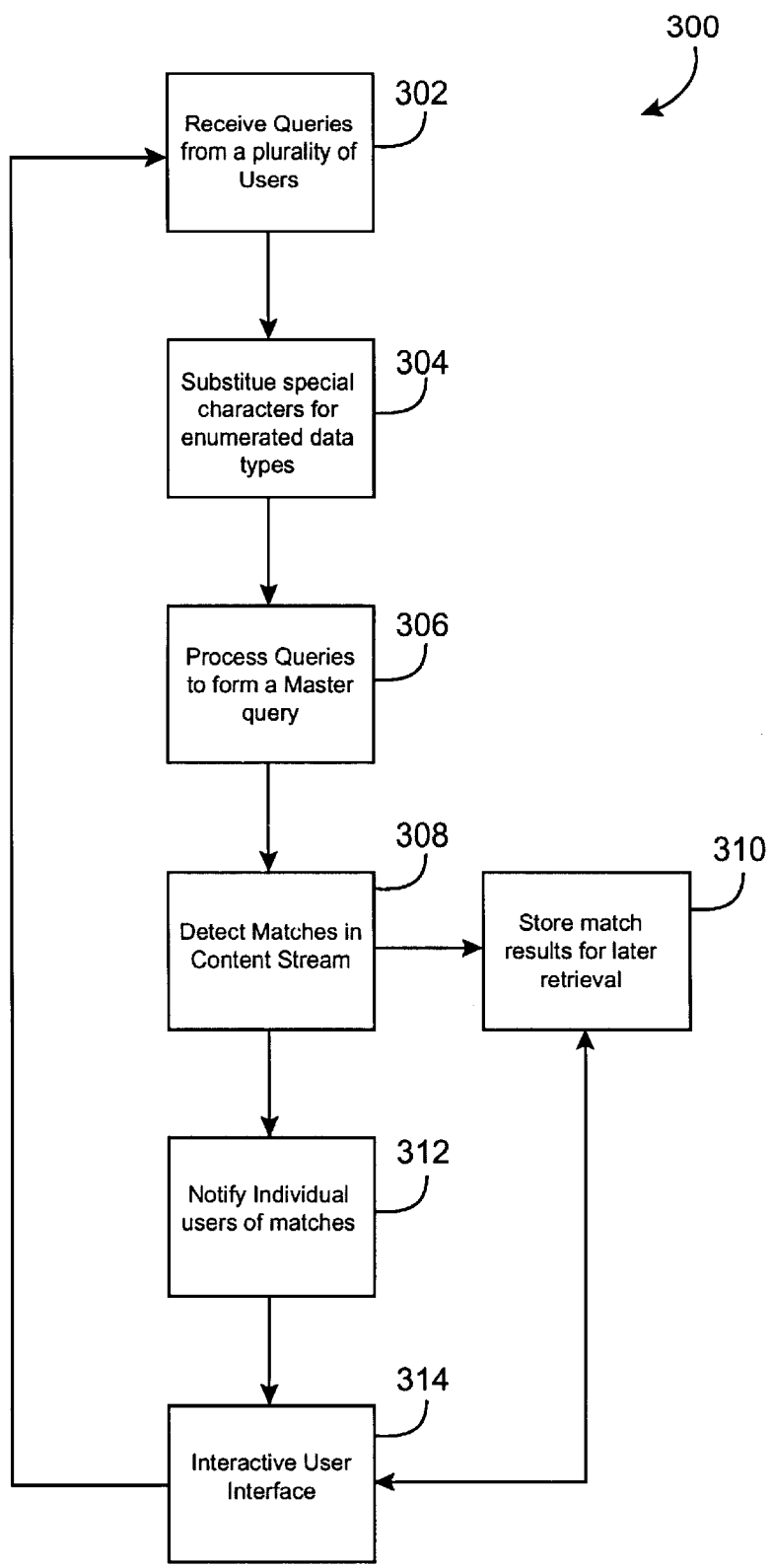
FIG. 3 shows a method of operating the search engine of FIG. 2 in accordance with the present invention.

FIG. 3 shows a method 300 for operating the search engine 102 in accordance with the present invention.

At block 302, the method 300 begins with the search engine receiving one or more queries from one or more users. The queries may be in the form of Boolean expressions using keywords and conjunctive operators, such and OR, AND, and NOT operators. A more detailed description of the user queries is provided in another section of this document.

At block 304, the user queries are received by the profile processor along with contact information. The contact information is provided by each user so that the results of the queries can be appropriately reported. At block 306, the queries are pre-processed so that special characters are substituted for numerical values and enumerated data types. The pre-processed queries are then combined to form a master search query.

At block 308, the information content stream is matched to the master search query. During this process, each document or information item in the content stream is compared to the master search query and an analysis is performed to determine if the information matches any of the user queries. A detailed description of the analysis is provided in another section of this document.

At block 310, any matches with the master search query are stored in the memory for later retrieval. At block 312, any matches are also reported to the notification processor so that user contact information can be retrieved from the profile processor and used to notify the users of the information matching the submitted query.

At block 314, if the user is unable to receive the notification information, a user interface is provided so that any matching information can be retrieved from the result storage at a time more convenient to the user.

Query Language

The search engine uses a query language that resembles typical query languages used with other types of Internet search engines. For example, Boolean operators, such as AND(+), OR and NOT(−) are supported. In addition, phrase matching is supported to allow searching for quoted strings. For example, the following queries are supported.

| | |
|---|---|
| 1. police + sting | Used to find all information content that includes the keyword "police" and the keyword "sting." |
| 2. python − monty | Used to find all information content that includes the keyword "python" but not the keyword "monty." |
| 3. "great barrier reef" | Used to find all information content that includes the phrase "great barrier reef." |

User Profile

Figure 4:
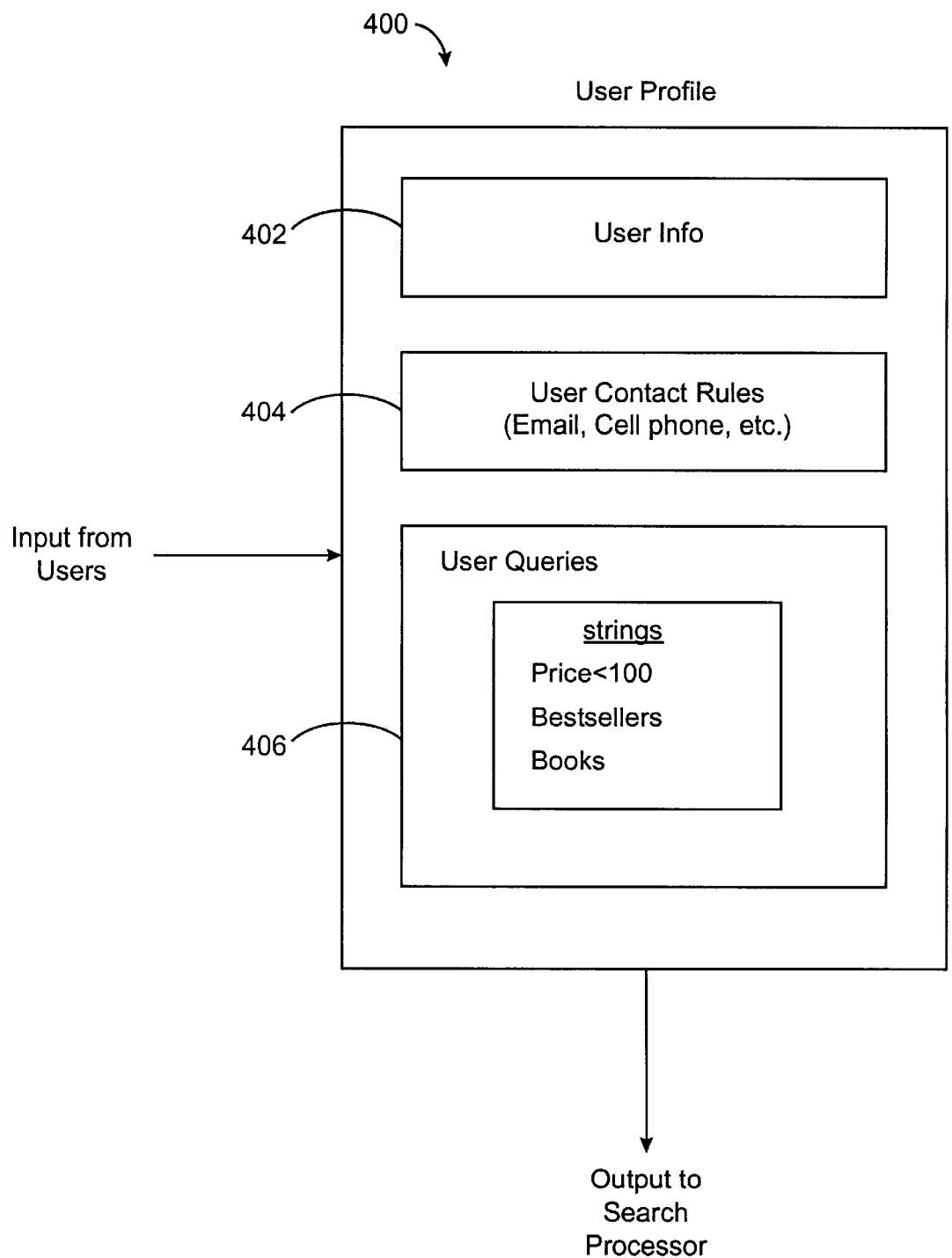
FIG. 4 shows a user profile constructed in accordance with the present invention.

FIG. 4 show a block diagram of a user profile 400 constructed from information provided by a user to the profile processor 204. The user profile 400 contains several types of information relating to the user and the user's desired search criteria. For example, the user profile 400 contains user identification information 402 which may include the user's network address and a time stamp for one or more queries contained in the user profile.

The user profile 400 also contains user contact information 404. The user contact information 404 may include rules that are use to contact the user regarding the results of any particular query. For example, the user may submit a query and request to be notified of the results by fax, email, or by an automated voice message to a landline or wireless telephone. Any type of communication mechanism may be used to contact the user regarding a search result. The rules included in the contact information may also specify a time for reporting the search result. For example, the user may wish to be notified regarding a search result in one hour, later that day, or even periodically every day. Thus, it is possible for the user to enter specific contact rules to set up a variety of notification scenarios regarding the results of any particular query.

The user profile 400 also includes user queries 406. The user queries are in the form of strings that include keywords and Boolean expressions specifying the information desired by the user.

Query Pre-Processing

In addition to matching strings, the search engine compares numbers that indicate quantities or prices. For example, a user may want to be alerted when an auction item reaches a certain price or when a shopping item drops below a certain price. For example, if a user would like to query for when the price of an item is less than $25.00, a query could be created as follows:

price<2500

Since exact price matching for a very large number of users is a computationally expensive operation, one embodiment of the present invention reduces exact price matching in some instances to the matching of price ranges. Each price range is represented by a predefined keyword for which the above keyword matching techniques will apply. Price range matching may be applied to query properties where additional precision is not relevant, thus maintaining efficiency without losing accuracy.

Matching Numbers and Prices¶

The prices of items in a product category typically fall into a general price range. For example, desktop computers may range in price from $500 to $2500. The price range may be partitioned into (N+2) intervals, where N can be any reasonably small number (e.g. 10). For example, if N is 4, then the six intervals of pricing for the price range of desktop computers would be [0, 500], [500, 1000], [1000, 1500], [1500, 2000] [2000, 2500] [2500, infinity].

Other numeric al characteristics, such as price ranges above or below a specific price, can be encoded with (2N+2) keywords, where each keyword includes an interval limit. For example, the interval limit (below__1000) means that the price is $1000 or below and the interval limit (above_1000) means that the price is $1000 or above. Therefore, referring to the example of the desktop computer, if N is 4, it is possible to form (2N+2) keywords to represent 10 price ranges for desktop computers as follows.
1. computer_desktop_price_below_500
2. computer_desktop_price_below_1000
3. computer_desktop_price_below_1500
4. computer_desktop_price_below_2000
5. computer_desktop_price_below_2500
6. computer_desktop_price_above_500
7. computer_desktop_price_above_1000
8. computer_desktop_price_above_1500
9. computer_desktop_price_above_2000
10. computer_desktop_price_above_2500

Suppose the user chose to be notified when the price range of a desktop computer is between 1000 and 1500. It is possible to create a user profile formed by only two keywords connected by the Boolean AND operator, as follows:

$computer_{13}$ desktop_price_above_1000 AND computer_desktop_price_below_1500

Therefore, for a given (N), the price of each product item that comes into the search system can be expanded into (N+1) or (N+2) keywords. For example, if a desktop computer sells for $1395, it can be automatically expanded into (N+1) keywords as follows.

computer_desktop_price_above_500 computer_desktop_price_above_1000 computer_desktop_price_below_1500 computer_desktop_price_below_2000 computer_desktop_price_below_2500

As a result, the $1395 desktop computer will match the example user criteria since it contains both of the specified keywords, namely:

computer_desktop_price_above_1000 AND computer_desktop_price_below_1500

In a case where the price is on the boundary of the specified range, it is possible to expand the price to (N+2) keywords. For example, if the price of the desktop computer in the above example was $1000, the following (N+2) keywords are derived:

computer_desktop_price_above_500 computer_desktop_price_above_1000 computer_desktop_price_below_1000 computer_desktop_price_below_1500 computer_desktop_price_below_2000 computer_desktop_price_below_2500

One advantage of doing the above expansion to the user query is that it can occur dynamically during matching time, while the query size in the profile stays small. Therefore, the cost of the required expansion space remains a constant; it is always (N+1) or (N+2) keywords. To summarize, once (N) is selected, price interval keywords can be defined. Both the user queries and the price of items in received documents can be mapped to those interval keywords, so that it is possible to detected when the price and query keywords match.

Query Normalization

One embodiment of the present invention operates to normalize queries that are input by users as part of the pre-processing stage. Normalization may also occur on queries that have been expanded as described in the pricing examples above. In general, any query can be represented by a series of "conjunctions" connected by the Boolean OR operator. For example, given the following search query:

keyword1 AND (keyword2 OR keyword3)

the following normalized query containing two conjunctions can be created:

(keyword1 AND keyword2) OR (keyword1 AND keyword3)

The portions of the normalized query in parenthesis represents conjunction portions. Depending on the query, the conjunction portions may contain one or more keywords and include the Boolean operators AND or NOT.

Search Processor Operation

Figure 5:
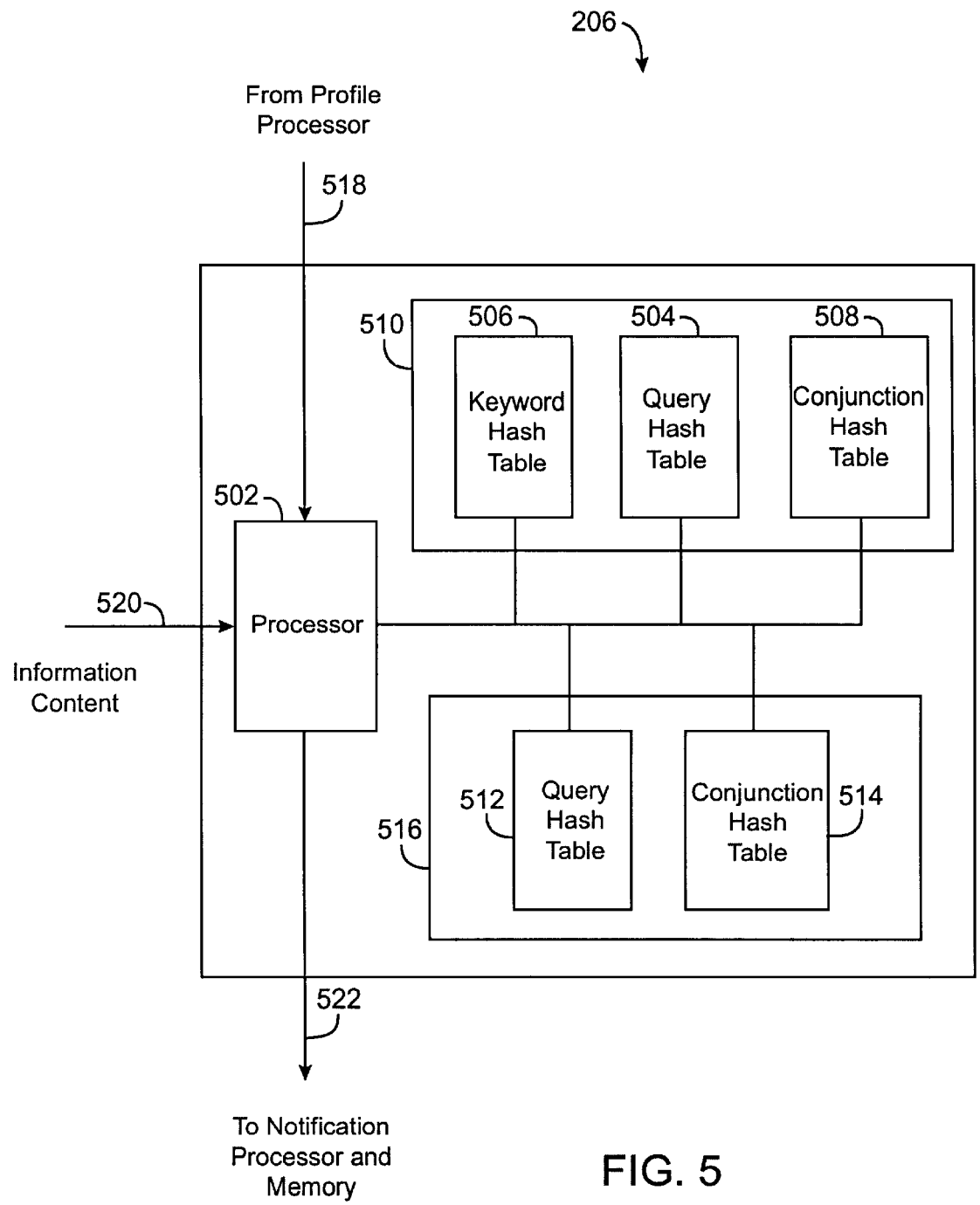
FIG. 5 shows a detailed diagram of a search processor constructed in accordance with the present invention.

FIG. 5 shows a detailed block diagram of the search processor 206 constructed in accordance with the present invention. The search processor is used to process all the user queries into a master query, which is matched with the incoming information content stream.

The search processor 206 includes a processor 502, a query hash 504, a keyword hash 506, and a conjunction hash 508, all located in a shared memory 510. The search processor 206 also includes a private query hash 512 and a private conjunction hash 514, both located in a private memory 516. The shared memory and the private memory may be formed from different memories or from a single memory.

Query Hash

The processor 502 receives the user queries from the profile processor 204 via input 518, performs the query expansions and normalizations as necessary and creates the master query by filling in the hash tables (506, 504, 508, 512, 514) in the shared 510 and private 516 memories. After the master query is created, the processor 502 receives information content via input 520 and matches the information content with the master query. The results are output to the memory 210 and the notification processor 208 via the output 522. The following description will reference the following exemplary user queries from four users, which are shown below as conjunctions having keyword "kw" entries. For example, kw1 and kw2 can represent price interval keywords as demonstrated above, while query4 searches for an exact numerical match to kw5.

User1 (query1): (kw1 AND NOT kw2)
User2 (query2): (kw2 AND kw3)
User3 (query3): (kw2 AND "pw1 pw2 pw3")
User4 (query4): (kw5<100)

Keyword Hash Table

Figure 6:
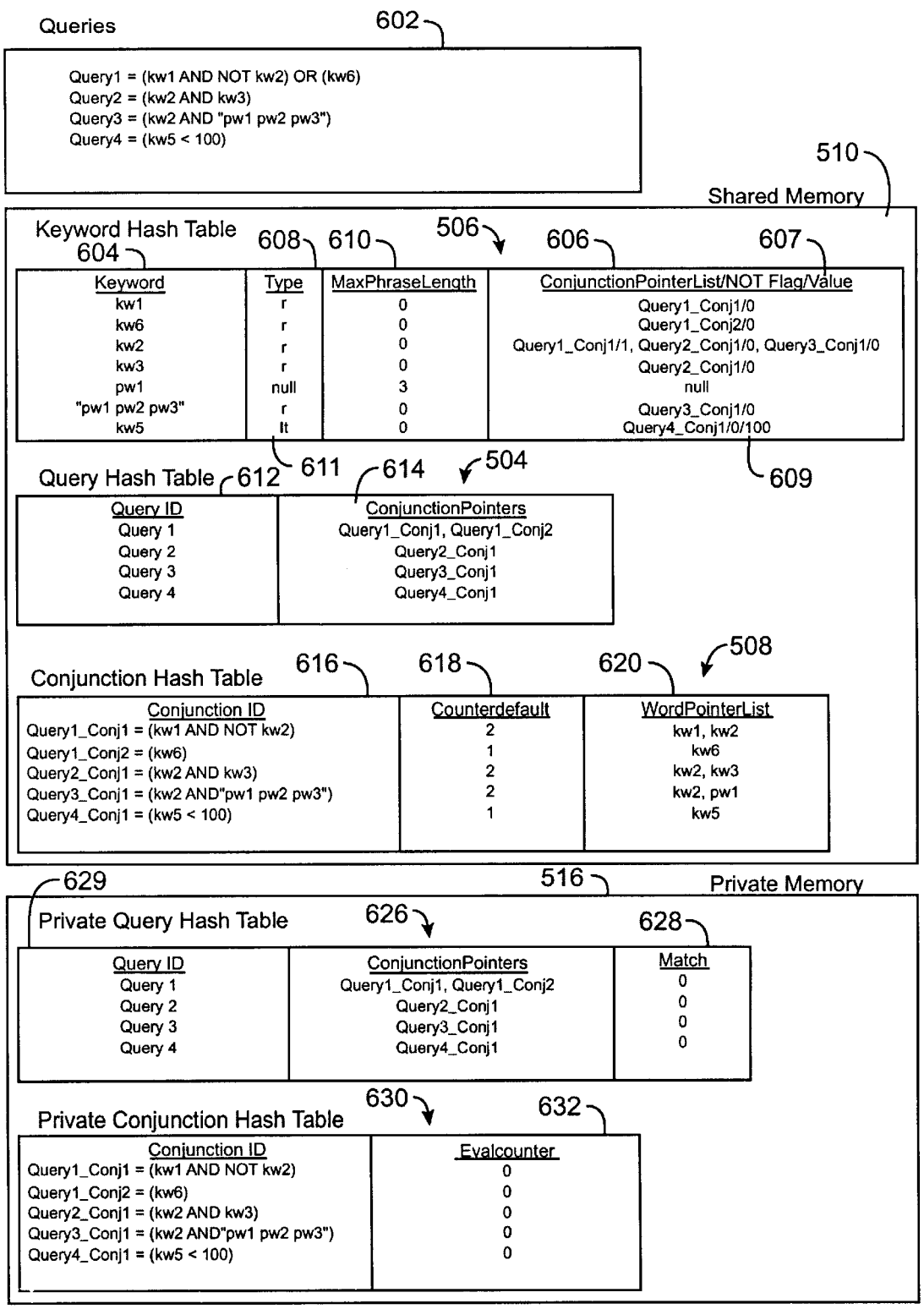
FIG. 6 shows hash tables created in accordance with the present invention.

FIG. 6 shows hash tables in the shared 510 and private 516 memories completed from the exemplary user queries 602 defined above. The keyword hash table 506 includes a Keyword column 604 where each keyword in the user queries is entered. Each keyword in the keyword hash table is associated with a conjunction pointer found in a ConjunctionPtrList column 606. The conjunction pointers point to all query conjunctions that use that particular keyword. The conjunction pointers are also associated with a NOT Flag indicator that indicates if the keyword in a particular conjunction was used with the NOT attribute. In this case, a zero means the keyword was used without the NOT attribute, while a one indicates that the keyword was used with the NOT attribute. In addition, a Value 607 parameter is associated with each conjunction, wherein a value is included for exact number matching. For example, query4 conjunction1, which corresponds to kw5 and includes a value of 100 as shown at 609.

Each keyword in the Keyword column 604 is further associated with one of five different keyword types shown in a Types column 608. The keyword types are:

| | |
|---|---|
| regular (r) | This type keyword has a unordered list of Conjunction pointers. |
| lessThan (lt) | This type keyword has conjunction pointers sorted in increasing order of value. |
| lessOrEqual (le) | This type keyword has conjunction pointers sorted in increasing order of value |
| greaterThan (gt) | This type keyword has conjunction pointers sorted in decreasing order of value. |
| greaterOrEqual (ge) | This type keyword has conjunction pointers sorted in decreasing order of value. |
| null | This type keyword is the first word of a phrase. |

With respect to query4, the type for kw5 is "lt" as shown at 611. Each keyword in the Keyword column is further associated with a phrase length value shown in a MaxPhraseLength column 610. This column has entries that represent how many words are included in a keyword phrase, with a phrase length value of zero being assigned to a one-word keyword phrase and a phrase length value of 1 being assigned to a two-word keyword phrase, and so forth.

FIG. 6 also shows the query hash table 504. The query hash table 504 associates the user queries in a query ID column 612, with conjunctions in a ConjunctionPtr column 614.

FIG. 6 also shows the conjunction hash table 508, which is used to assemble information about every conjunction. Every conjunction is represented by a ConjunctionID 616, which is associated with a counter default 618 that stores the number of keywords in each conjunction. A WordPointerList column 620 contains a pointer to the keywords in the WordsHash table 506 for each conjunction.

The Keywords hash, Query hash and Conjunction hash can be stored in a shared memory 510, so that several matching processes can read the hash contents concurrently. The query hash and conjunction hash have corresponding tables in a private memory 516. A private query hash 626, includes a match column 628 that is used during processing to indicate when a query in the query ID column 629 matches any incoming information content. A private conjunction hash 630, includes an Eval counter column 632 that is used during processing to keep track of the number of keywords found in the incoming information content for each conjunction. The records in the private memory contain state information that is local to the execution of each process, so that it is possible to have several private memories in use during operation of the invention.

Each matching process performs the matching of incoming documents against the master query and stores information during the matching in its associated private memory. In order to increase the throughput of a matching processor, multiple matching processes can be executed simultaneously. In this case, each process uses its private memory for non-shareable state information.

Search Processing (Keyword and Phrase Matching)

Figure 7:
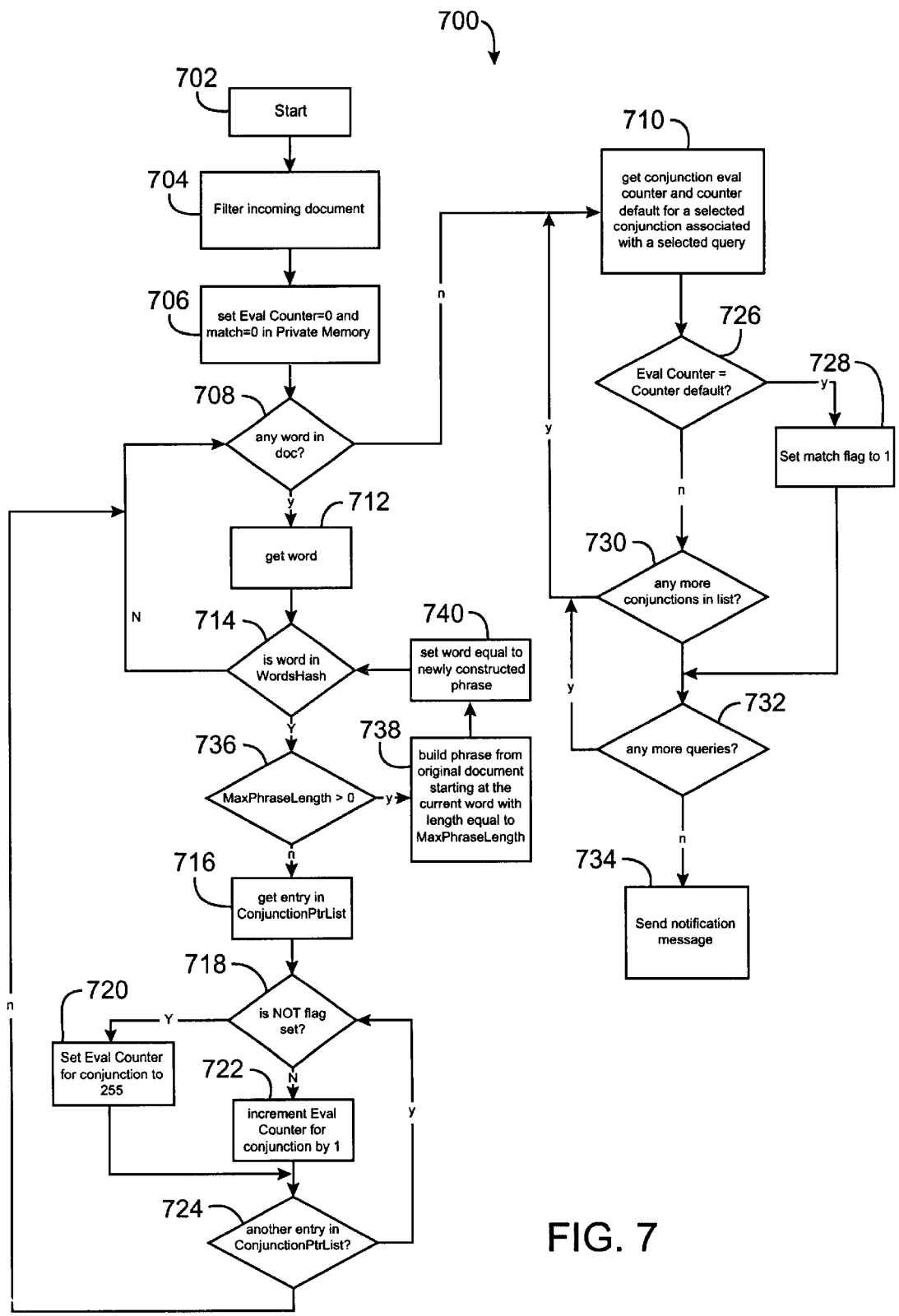
FIG. 7 shows a method of operating the search engine of FIG. 2 in accordance with the present invention.

FIG. 7 shows a search method 700 for searching incoming information content in accordance with the present invention. When starting a matching process for each incoming document, the Private Query Hash 626 and the Private Conjunction Hash 630 are created in the following manner:

Read lock the Query Hash table 404 to prevent changes during creation of private memory;

Iterate over all queries and create the Private Conjunction Hash 630 for each conjunction; and Release Read lock on the Query Hash 404.

After creating the private memory, the searching method provided in FIG. 7 is used to match all user queries with each document of the incoming information content.

At block 702, the search method 700 begins by receiving information content which may comprise, for example, a stream of documents relating to real-time weather reports or auction information. At block 704, the incoming documents are filtered to remove duplicate words. At block 706, the EvalCounter 632 is set to 0 for all query conjunction entries and Match flag 628 is set to zero for all queries.

At block 708, a check is made to determine if any words remain to be matched. This check determines a condition where an entire document has been checked and, if no words remain to be checked, results in a branch to block 710, which is discussed in detail below.

At block 712, a word is retrieved from the filtered document for matching. At block 714, a test is performed to determine if the retrieved word is in the word hash table 406. If the word is not in the word hash table, the method proceeds to block 708 to look for the next word. If the word is in the word hash table, the method proceeds to block 736.

At block 736, a test is performed to determine if the keyword is part of a phrase. If the maxphraselength parameter associated with the keyword is zero, then the keyword is not part of a phase, and so the method proceeds to block 716. If the maxphraselength is greater than zero, the keyword is part of a phrase, and so the method proceeds to block 738.

At block 738, a phrase is built from the original unfiltered document by starting at the current keyword and including additional words until the phrase has a length equal to the maxphraselength associated with the keyword. The method then proceeds to block 740.

At block 740, the newly constructed phrase is substituted for the word retrieved from the filtered document at block 712. The method then proceeds to block 714 where the test at that block determines if the phrase is in the keyword hash. If the phrase is found, the associated maxphraselength will be zero and so the method will flow through the test at block 736 and proceed to block 716.

At block 716, the first entry in the conjunction pointer list 606 associated with the keyword (or phrase) is retrieved. At block 718, the NOT flag associated with the conjunction pointer is tested. If the not flag is set, the method proceeds to block 720, where the Eval counter entry for the conjunction is set to 255. This indicates that this conjunction has not been matched.

At block 722, if the NOT flag associated with the conjunction is not set, then the Eval counter is incremented by 1, which indicates that a match occurred between the keyword and the conjunction.

At block 724, a test is made to determine if there are any more conjunctions entries associated with the keyword. If there are not, the method proceed to block 708 to retrieve the next word in the document. If there are additional conjunction entries, the method proceeds to block 716 to get the next entry in the list for the or each word in the received article a test is made to determine if the word is in the keyword hash table.

At block 710, after each word in the document has gone through the matching process, the method proceeds here to analyze the results. At this block, the conjunction Eval counter and default value for a selected conjunction associated with a selected query are retrieved. For example, referring to query1, in the query hash table, the Eval counter and default counter for conjunction Query1_Conj1 is retrieved.

At block 726, a test is made to determine if the Eval counter is equal to the counter default. If the Eval counter is not equal to the counter default, then the conjunction has not been satisfied and the method proceeds to block 730. If the Eval counter matches the counter default, then the conjunction has been satisfied and the method proceeds to block 728.

At block 728, the match flag for the query is set to one since the keywords specified by the conjunction were matched in the document. Thus, the query has at least one conjunction that matches the information in the document. The method then proceeds to block 732.

At block 730, if the Eval counter did not match the default counter, a test is performed to determine if any more conjunctions are associated with the current query. If there are more conjunctions to be tested, then the method proceeds to block 710 to test these conjunctions. If there are no more conjunctions associated with the query then the method proceeds to block 732 to process other queries.

At block 732, a test is performed to determine if there are any additional queries to be tested. If so, the method proceeds to block 710. If all queries have been tested, the method proceeds to block 734.

At block 734, notification messages are sent to users whose queries have a match value equal to 1. The notification can be immediate or delayed as required by the notification rules as discussed in other sections of this document.

Exact Number Matching

Exact number matching can be used when a user query is searching for an exact price instead of a price within a specified range. In one embodiment, sorted lists are used for the exact number matching. When the list is sorted in increasing order, it is simple to step through the list from the beginning to determine all users that have signed up for an alert upon finding the desired exact value (in most cases the value would be a price). The problem with large sorted lists is that as queries are added or removed, the INSERT and DELETE operations become computationally expensive.

In order to alleviate the problem of high computational costs, a data tree structure is used. A binary search tree of height h can implement any of the basic set operations—such as INSERT and DELETE—in O(h) time. The set operations are fast, if the height of the search tree is small, but if its height is large, their performance may be no better than a linked list.

Red-black trees are one of many search-tree schemes that are "balanced" in order to guarantee that basic set operations take O(log n) time in the worst case. A red-black tree is a binary search tree with one extra bit of storage per node: its color, which can be either red or black. By constraining the way nodes can be colored on any path from the root to a leaf, red-black trees ensure that no such path is more than twice as long as any other, so that the tree is approximately balanced.

In one embodiment of the invention, a red-black tree is used to order and maintain the ConjunctionPointerList 606. The red-black tree can return for any value (price) the set of surrounding intervals and during operation of the method 700 above, the Evalcounter variable 632 in private ConjunctionsHash can be incremented when a match occurs.

Auto Suspend Alerts

In one embodiment, notification alerts may be suspended for a period of time after they have been tripped. For example, a stock price alert for XYZ>80 would need to be suspended after the stock has been traded over $80 for the first time on a given day. A user would not want to be alerted repeatedly for the rest of the trading day if the price stays over $80. In this case, the alert is suspended for the rest of the trading day after it has been tripped.

Auto Delete Alerts

In one embodiment, the notification alert is removed after the alert has been tripped. For example, a search query such as "alert me when the movie Casa Blanca is released on DVD" will only happen at one point in time. Therefore, the notification alert is not needed after the alert has been tripped. In this case, tripping the alert would also result in an action to remove the alert from the system.

Indexing Incoming Articles

To further improve the matching performance of the search engine, one embodiment included in the present invention indexes the incoming articles into a pre-organized set, which can be processed in the following way. A set of n articles (4 articles A1 to A4) is collected. Each word in the article set gets assigned a bit vector of length n. When a bit is set in the bit vector, the particular word is present in the corresponding article. The bit vectors get initialized before the search method 700 is executed. Another column in the Keyword Hash Table 506 is included so that the keyword entries in the Keyword Hash Table have an additional pointer to the bit vector for an individual word.

After the method 700 has been executed, one additional step is required to determine the set of documents that needs to be returned to a single user. For all Conjunction IDs with an Evalcounter equal to it respective Counterdefault, the WordPointerList pointer is followed to obtain the pointer to the bitvector for all keywords in the conjunction. All bitvectors are AND together to produce the bitmask of all articles that matched the conjunction.

For example, to index 4 articles consider the following two queries:

ConjId1=blue AND black
ConjId2=Sunnyvale AND Rent_600

The Bitvectors for each word in the article collection can be expressed as follows:

|  | Incoming Articles | | | |
| --- | --- | --- | --- | --- |
| Words | A1 | A2 | A3 | A4 |
| blue | 0 | 0 | 1 | 1 |
| black | 1 | 0 | 1 | 0 |
| sunnyvale | 0 | 1 | 1 | 0 |

Based on the above, the Keyword Hash Table would include a Document Bit Vector Pointer column that would contain the following information.

| KeyWord Hash Table | | |
| --- | --- | --- |
| Keyword | DocumentBitvectorPtr | ConjunctionsPointerList |
| blue | 0011 | ConjId1 |
| black | 1010 | ConjId1 |
| sunnyvale | 0110 | ConjId2 |
| rent_600 | NULL | ConjId2 |

If the keywords "blue" and "black" are searched for, then by ANDing together the corresponding bit vectors, it can be determined that article 3 contains both and thus present a match to the query. Therefore, the above article indexing allows multiple articles to be organized and searched simultaneously, thereby reducing processing costs.

EXAMPLES

Shopping/Classifieds/Auctions
User Interface

In most cases the Boolean query language used in embodiments of the present invention may be hidden by an HTML form where the user selects from a set of predefined choices. Alternatively, a persistent query can be derived from a regular search query that the user entered or from the category that the user is currently browsing.

Shopping for Computer

An HTML interface for the computer category may have the following attributes:

Brand: XXX, YYY, ZZZ, XYZ, YYZ, ZZX

Processor (at least): 486, Pentium, Pentium Pro

Minimum Price: 800, 1000, 1200, 1400

Maximum Price: 800, 1000,1200, 1400

Memory (at least): 8, 16, 32, 48, 64, 128

Hard Disk (at least): 1, 1.5, 2, 3, 4, 6, 8

CD Rom (at least): 2x, 4x, 6x, 8x, 10x

DVD(at least): 2x, 4x, 6x, 8x, 10x

Modem (at least): 14.4, 19.2, 28.8, 33.6, 56

From the above information, a search query could be generated. For example, if a user is looking for a XXX computer in the price range of $1200 to $1400, with at least a Pentium processor, the HTML query system would generate the following query:

Shopping_Computer AND Brand_XXX AND Proc_Pentium AND ShopPrice_above_1200;

Shopping_Computer AND Brand_XXX AND Proc_Pentium AND ShopPrice_below_1400;

Shopping_Computer AND Brand_XXX AND Proc_PentiumPro AND ShopPrice_above_1200;

Shopping_Computer AND Brand_XXX AND Proc_PentiumPro AND ShopPrice_below_1400.

Classifieds

Classified ads for may include attributes other than price, such as automobile make, model, location, phone area code, price range, year, mileage, for sale by (owner/dealer). To accommodate these other attributes, embodiments of the notification engine allow queries such as, "Find a car in the Bay Area in the price range from $2000 to $5000", to be processed into:

Classifieds_Car AND Location_CA_SFO AND CarPrice_above_2000

Classifieds_Car AND Location_CA_SFO AND CarPrice_below_5000

Auctions

Auctions are a good candidate to apply exact number matching. With exact number matching it is possible to immediately notify users if their current bid gets outbid. For example, a query can be constructed to automatically determine when a bid is exceeded, such as:

Auction_Toy AND blue AND eye AND furby AND CurrentBid>51.75

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A search engine for receiving information content over a data network and searching the information content based on a plurality of user queries associated with a plurality of users, the search engine comprising:

a profile processor having logic to receive the user queries from the users; and a search module coupled to the profile processor and having logic to receive the information content, to combine the user queries from the plurality of users into a master query, and to match the master query with the information content to determine a master query result, said search engine also including logic to analyze the master query result to determine if any of the user queries can be satisfied from the master query result.

2. The search engine of claim 1, further comprising a notification module having logic to notify the users whether their respective user queries have been satisfied.

3. The search engine of claim 1, wherein the profile module comprises a user interface module that has logic to receive the plurality of user queries.

4. The search engine of claim 1, wherein the search module further comprises a memory for storing the master query result.

5. The search engine of claim 1 wherein the user queries include text search strings and Boolean expressions.

6. A search engine for receiving information content over a data network and searching the information content based on a plurality of queries associated with a plurality of users, the search engine comprising:

a profile processor having logic to receive the queries from the users; and a search module coupled to the profile processor and having logic to receive the information content, to combine the user queries into a master query, and to match the master query with the information content to determine matching content, said search engine also includes logic to analyze the matching content to determine if any of the queries has been satisfied, wherein the search module comprises logic to create hash tables from the user queries and to match the information content with information in the hash tables.

7. A method for searching information content received over a data network, the method comprising the steps of:

receiving a plurality of user queries from a plurality of users;

receiving the information content over the data network;

combining the user queries from the plurality of users into a master query;

matching the master query with the information content to determine a master query result; and analyzing the master query result to determine if any of the user queries can be satisfied from the master query result.

8. The method of claim 7, further comprising a step of notifying the users whether their respective user queries have been satisfied.

9. A method for searching information content received over a data network, the method comprising the steps of:

receiving a plurality of queries from a plurality of users;

receiving the information content over the data network;

combining the user queries into a master query;

matching the master query with the information content to determine matching content; and analyzing the matching content to determine if any of the queries has been satisfied, wherein the step of combining includes steps of:

normalizing the user queries to form normalized user queries that include a plurality of conjunctions formed from keywords; and forming a plurality of hash tables from the conjunctions and the keywords.

10. The method of claim 9, wherein the step of matching comprises steps of:

determining if any of the keywords are in the information content; and updating the hash tables based on the results of the step of determining.

11. The method of claim 10, wherein at least one keyword comprises a text phrase and the step of matching comprises a step of determining if the text phrase is in the information content.

12. The method of claim 11, wherein the step of analyzing comprises a step of updating a match parameter based on which conjunctions were found in the information content.

13. The method of claim 12, wherein the step of notifying includes a step of notifying the users based on the match parameter.

* * * * *